Dec. 24, 1940.　　　　　E. J. COOK　　　　　2,225,821
REPRODUCING MACHINE
Filed Oct. 4, 1939　　　　3 Sheets-Sheet 1

INVENTOR.
Everett J. Cook
BY
ATTORNEYS

Dec. 24, 1940.    E. J. COOK    2,225,821
REPRODUCING MACHINE
Filed Oct. 4, 1939    3 Sheets-Sheet 2
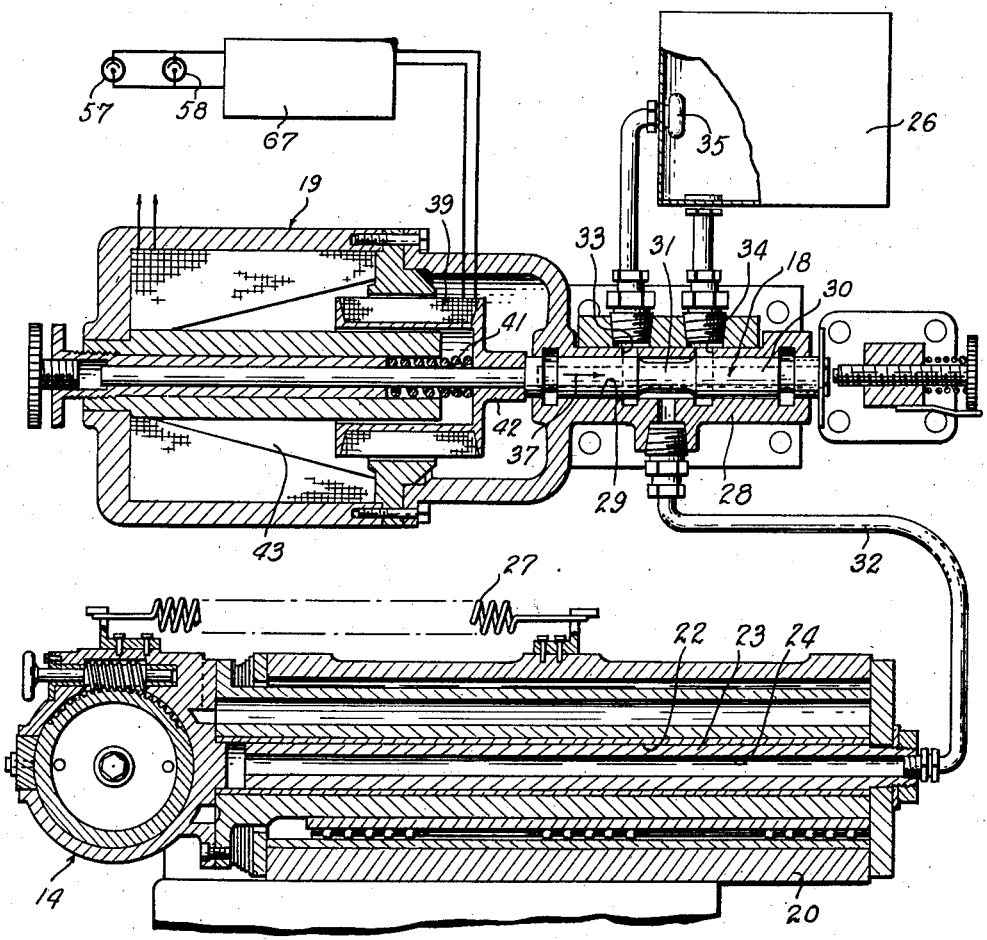
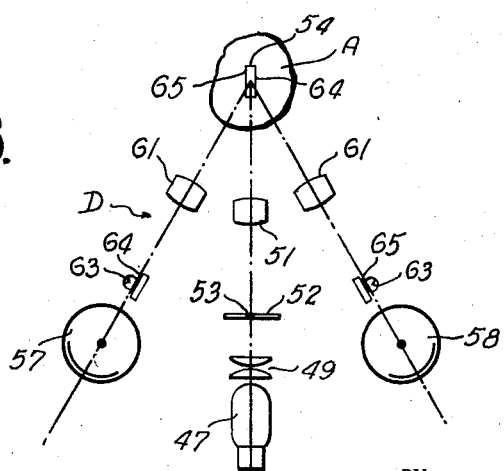
Fig. 2.
Fig. 5.
INVENTOR.
Everett J. Cook
BY 
ATTORNEYS Dec. 24, 1940.  E. J. COOK  2,225,821

REPRODUCING MACHINE

Filed Oct. 4, 1939  3 Sheets-Sheet 3

INVENTOR.
Everett J. Cook
BY
ATTORNEYS

Patented Dec. 24, 1940

2,225,821

UNITED STATES PATENT OFFICE 2,225,821

REPRODUCING MACHINE

Everett J. Cook, Toledo, Ohio, assignor to H. H. Buggie & Company, Toledo, Ohio, a corporation of Ohio Application October 4, 1939, Serial No. 297,938

6 Claims. (Cl. 90—13.5)

This invention relates generally to a reproducing apparatus and refers more particularly to improvements in reproducing machines of the type wherein the movement of a tool relative to a work blank is controlled by the contour of a pattern surface in accordance with the operation of a light sensitive cell scanning said surface.

In reproducing machines of the above general type, it is customary to project an illuminated image on the surface of the pattern to be reproduced so that at least one edge of the image represents a true section of the surface as viewed from a light sensitive cell predeterminedly supported with respect to the surface. The edge aforesaid of the image is commonly referred to as a contour line and the light sensitive cell controls the operation of the tool in accordance with variations in flux of radiant energy reflected from the portions of the pattern surface at opposite sides of the contour line. In one type of machine that has achieved considerable success in accurately reproducing pattern surfaces, the light sensitive cell is supported for movement and the image is reflected from the surface of the pattern on an apertured plate in front of the light sensitive cell with the contour line intersecting the aperture. The arrangement is such that as the aperture alternately intercepts the illuminated and shaded portions of the image at opposite sides of the contour line, the light sensitive cell is moved in opposite directions by mechanism controlled by the light sensitive cell. As a result, the aperture is maintained in intersecting relationship with the contour line and by merely interconnecting the tool with the light sensitive cell, it follows that the cutting end of the tool will reproduce the contour represented by the line in the work blank.

While the general arrangement briefly outlined above has proved highly satisfactory for accurately duplicating surface contours, nevertheless, it has certain limitations. For example, in copying highly irregular surfaces, it has been found that in certain positions of the model relative to the optical system, the light or radiant energy is reflected from the model at such an angle as to completely escape the aperture in the plate shielding the light sensitive cell. Of course, such a condition is serious and either prohibits the use of the machine or renders the resulting product unsatisfactory.

The present invention contemplates overcoming the foregoing objection by providing an optical system having light sensitive cells arranged so as to receive radiant energy from the surface of the model scanned regardless of the contour of this surface. As a result, the limitations specifically referred to above are eliminated and the surface of the model is accurately reproduced notwithstanding the extent of the irregularities therein.

The foregoing, as well as other objects, will be made more apparent as this description proceeds, especially when considered in connection with the accompanying drawings, wherein:

Figure 2 is a sectional view illustrating the mechanism for controlling the operation of the tool;

Figure 5 is a diagrammatic view illustrating the principle of operation of the optical system.

It will be understood as this description proceeds that the optical system forming the subject matter of this invention may be advantageously used in combination with practically any type of reproducing machine where the movement of the tool is controlled by a light sensitive cell scanning the surface of the model or pattern to be reproduced. However, in order to more clearly illustrate the principle of operation of the optical unit, I have shown this unit in combination with a reproducing machine for fashioning a mold cavity in a work blank to the exact size and shape of the article it is desired to cast, although it will be obvious as this description proceeds that the optical unit is equally effective when employed to reproduce the surface contour of the pattern in cameo in the work blank.

Figure 1:
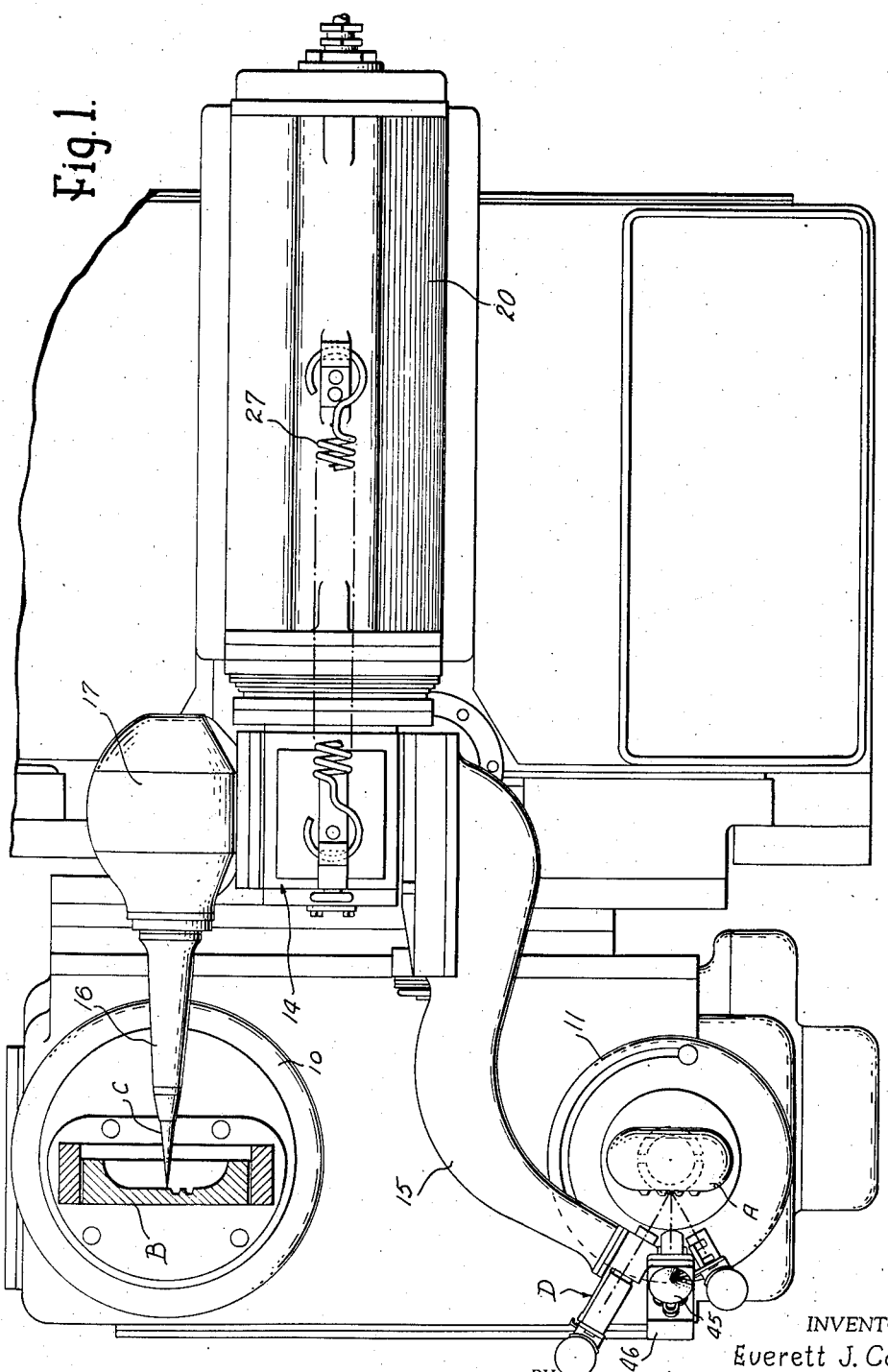
Figure 1 is a top plan view of a portion of a reproducing machine controlled by an optical system constructed in accordance with this invention.

Inasmuch as the machine shown herein is primarily for the purpose of illustrating one typical application of the optical system forming the subject matter of this invention, it is not believed necessary to describe the machine in detail. Briefly, it will be noted from Figure 1 that the machine comprises a work support 10 and a pattern support 11 mounted in side by side relationship on a traversing carriage 12 supported for both vertical and horizontal movement. The mechanism for feeding the carriage in the above directions is not shown herein but may be the same as illustrated in my Patent No. 2,154,974, dated April 18, 1939. Also, in duplicating certain types of models, it is advantageous to oscillate the work and pattern supports relative to the carriage 12. The above identified patent discloses mechanism for accomplishing this result and this mechanism may be employed in the present machine for effecting the desired oscillation of the supports.

A pattern A is mounted on the support 11 for oscillation therewith as a unit and a work blank B is secured to the support 10 for movement with the latter. The pattern corresponds in shape to the article it is desired to cast in the mold cavity to be formed in the work blank B and is preferably coated with or fashioned from a good light reflecting material.

In the present instance, the outer half of the surface of the pattern A is scanned by an optical unit D and the latter controls the movement of a tool C positioned directly opposite the inner side of the work blank B. Both the tool C and optical unit D are mounted on the forward end of a ram 14 which, in turn, is supported for reciprocation toward and away from the traversing carriage 12. The optical unit D is supported opposite the pattern A at the outer side of the latter on an arm 15 having the inner end secured to the forward end of the ram so that movement of the ram in a direction toward the carriage 12 effects a corresponding movement of the optical unit D away from the pattern A. The tool, on the other hand, is mounted on a spindle 16 driven by an electric motor 17 secured directly to the ram so that movement of the latter toward the carriage 12 effects a movement of the tool C toward the work blank B. In other words, the arrangement is such that the tool C is fed into the work by the ram 14 when the optical unit is moved by the ram away from the pattern A.

Upon reference to Figure 2, it will be noted that the ram 14 is operated by fluid pressure in dependence upon the operation of the valve 18 controlled by an electromagnet 19. Briefly described, the ram is slidably supported in a casing 20 and is provided with a cylinder 22 having a piston 23 therein. In the present instance, the piston 23 is fixedly secured to the frame of the machine against movement and is axially bored to provide a passage 24 therethrough. The rear end of the bore or passage 24 alternately communicates with a source of fluid under pressure and with the interior of the fluid supply tank 26 through the medium of the valve 18. The inner end of the cylinder 22 is closed by and is secured to the head of the ram so that fluid under pressure supplied to the cylinder 22 through the passage 24 effects a movement of the head together with the cylinder in a direction toward the traversing carriage 12. On the other hand, when the pressure in the passage 24 is exhausted by the valve 18, the ram is moved in the opposite direction by a suitable spring 27.

The valve 18 comprises a casing 28 having a bore 29 therethrough for slidably receiving a valve plunger 30. The valve plunger 30 is formed with a reduced portion 31 intermediate the ends thereof arranged in constant communication with the rear end of the passage 24 through the ram piston 23 by a conduit 32 and respectively establishes communication between the bore or passage 24 and ports 33 and 34 as the plunger 30 moves in opposite directions from the neutral position thereof shown in Figure 2. The port 33 communicates with the discharge side of a suitable pressure pump located within the fluid supply tank 26 and the port 34 communicates with the interior of the tank 26. The arrangement is such that movement of the plunger 30 in the direction of the arrow 37 from the position shown in Figure 2 establishes communication between the passage 24 and the port 34 communicating with the supply tank 26. As a result, fluid pressure is exhausted from the ram and the latter is moved in a direction away from the carriage 12 or, in other words, the tool C is withdrawn from the work and the optical unit D is moved toward the pattern A. Of course, movement of the valve plunger 30 in the direction opposite the direction indicated by the arrow 37 establishes communication between the passage 24 and the port 33 communicating with the discharge side of the pressure pump 35. As a result, fluid under pressure is built up in the passage 24 and the ram 10 is moved by fluid pressure against the action of the spring 27 in a direction to feed the tool C into the work B and to move the optical unit away from the pattern A. Upon reference to Figure 2, it will be noted that the valve plunger 30 is moved in a direction to feed the tool into the work by energizing a load coil 39 of the electromagnet 19 and is moved in the opposite direction to withdraw the tool from the work by a spring 41 acting on the armature 42 of the electromagnet to resist movement of the coil 39 into the magnet 43.

The operation of the electromagnet 19 is controlled by the optical unit D in accordance with changes in shape of the surface of the pattern scanned by the optical unit. Upon reference to Figures 3 to 5, inclusive, it will be noted that the optical unit D is provided with two projectors 44 and 45. Each projector comprises a house 46 having a source of illumination 47 suitably supported therein and having a reflector 48 located at the inner side of the light source to direct the rays of light toward condenser lenses 49 positioned in the house at the opposite side of the light source. The condenser lenses 49 direct the rays of light into a lens barrel 50 having its axis aligned with the common axis of the condenser lenses and supporting suitable objective lenses 51 at the outer end thereof. Extending transversely of the axis of the lens barrel between the two pairs of lenses is a plate 52 having an image aperture 53 therethrough and adjustable relative to the house in order to permit accurately positioning the image aperture 53 relative to the axis of the lens barrel. The image aperture 53 associated with each projector is shown in Figure 5 as comprising a relatively narrow elongated slot in the plate 52 and, as a result, a light image of the type designated in Figure 5 by the reference character 54 is projected by each of the projectors.

Figures 3, 4:
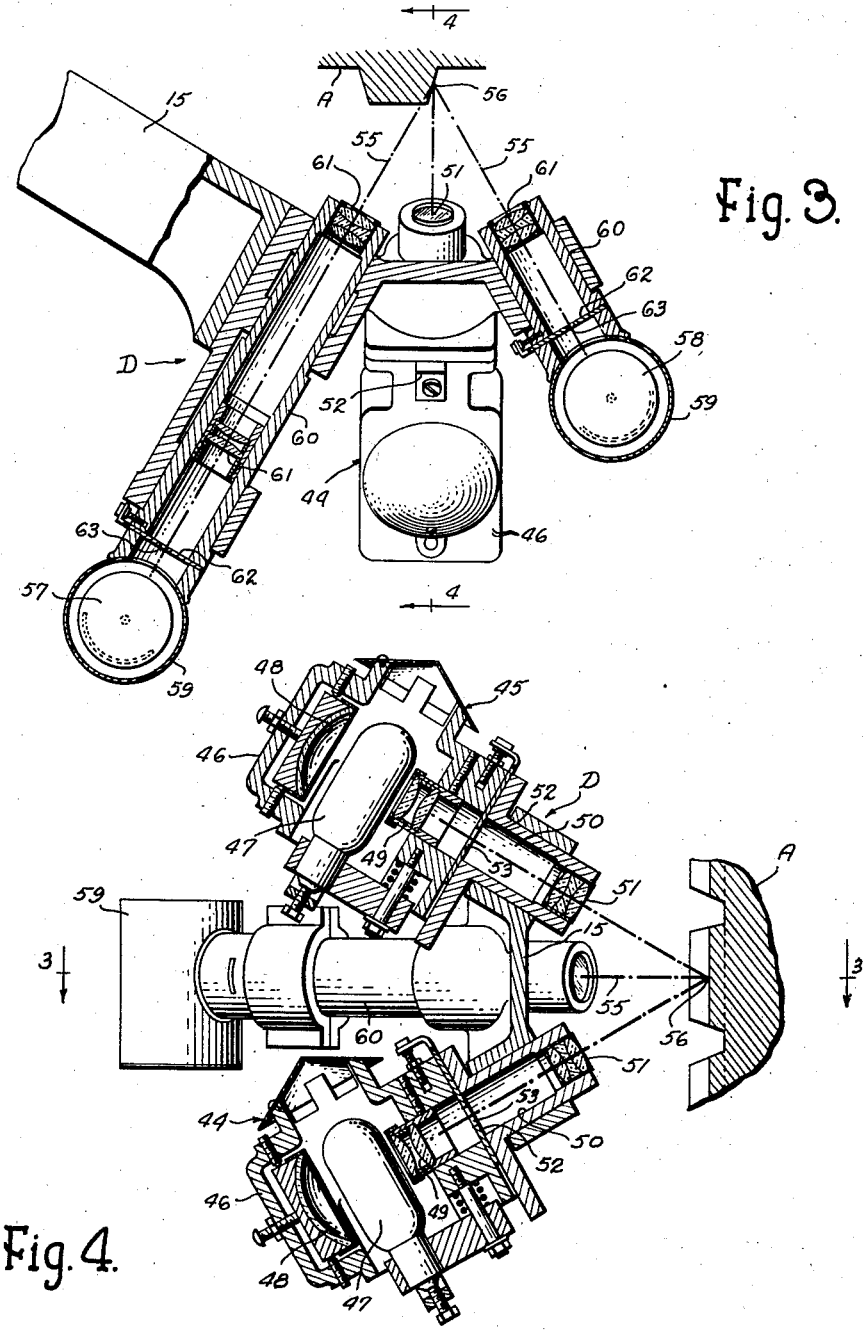
Figure 3 is a plan view of the optical unit.
Figure 4 is a sectional view taken substantially on the plane indicated by the line 4—4 of Figure 3.

The light projectors 46 are supported on the optical arm 15 in a common vertical plane at opposite sides of a horizontal plane, designated in Figure 4 by the line 55, and are arranged at an angle to each other so that the axes of the lens barrels 50 intersect one another at the focal point 56. In the specific embodiment of the invention, the axes of the lens barrels form an angle of 30° with opposite sides of the plane 55 and the focal point 56 is located on the surface of the model A. As a result, the two projectors cooperate to cast a single image 54 on the surface of the model A to be reproduced in the work blank.

In addition to the projectors, the optical unit also comprises a pair of photoelectric cells 57 and 58. The photoelectric cells are identical in construction with the exception of size and each cell is located in a house 59 having a lens barrel 60 projecting outwardly therefrom. Supported within each of the lens barrels are suitable lenses 61 for focusing radiant energy on a plate 62 extending transversely of each lens barrel adjacent the light sensitive cell associated therewith to shield the cells from the radiant energy. Each plate 62 is provided with an aperture 63 therethrough and is adjustably mounted to provide for varying the position of the aperture with reference to the respective axes of the lens barrels.

The photoelectric cells are also mounted on the optical arm and are supported with the axes of the lens barrels in the horizontal plane 55. It will be apparent from Figure 3 that the light sensitive cells are disposed at opposite sides of the vertical plane including the axes of the projectors 44 and 45 and are arranged at such an angle with respect to each other that the axes of the lens barrels intersect one another at the focal point 56 on the surface of the pattern to be reproduced.

It has previously been stated that the light image 54 is of a relatively narrow oblong shape and it will be understood that the opposite longitudinal edges 64 and 65 of the image form contour lines which represent sections of the pattern surface when viewed from the positions of the light sensitive cells. Upon reference to Figure 5, it will be noted that the image 54 is reflected from the surface of the pattern on each of the plates 62 and the latter are adjusted so that the apertures 63 intersect the contour lines of the image. The image 54 is, of course, reversed when reflected on the plates 62 of the light sensitive cells so that the contour line 65 of the image intersects the aperture 63 of the light sensitive cell 58 and the contour line 64 intersects the aperture 63 of the light sensitive cell 57.

The above condition exists when the surface of the pattern scanned is flat or substantially flat, but in the event the pattern surface is irregular as shown in Figure 3, it will be noted that the radiant energy or light reflected from the irregular surface of the model is blocked from the light sensitive cell 59 and, therefore, movement of the tool is controlled solely by the light sensitive cell 58. There are, of course, instances where the reflection of light on the light sensitive cell 58 is blocked and in cases of this character, the light sensitive cell performs the sole control function.

Assuming, however, that the surface of the model scanned is sufficiently flat that the illuminated image 54 is reflected on the plates 62 of both photoelectric cells, it will be noted that as the surface of the pattern, in effect, approaches the optical unit D, the illuminated images are shifted relative to the apertures 63 in the plates 62 in a direction to increase the intensity of light passing through the apertures to the light sensitive cells. As a result, both light sensitive cells become conductive and since the cells are shown in Figure 2 as connected in parallel in the circuit to the electromagnet 19, it follows that the load coil 39 of the electromagnet is energized. In this connection, it may be pointed out that the output sides of the light sensitive cells are connected to the load coil 39 of the electromagnet through the medium of a thermionic tube amplifier 67 which may be similar to the amplifier shown in my copending application Serial No. 276,425, filed May 29, 1939.

Energization of the load coil 39 of the electromagnet 19 effects an operation of the valve 18 to supply fluid under pressure to the passage 24 in the ram 14 and thereby cause the ram to move in a direction to feed the tool C into the work. Owing to the particular arrangement previously set forth, movement of the tool C in a direction toward the work effects a corresponding movement of the optical unit D away from the pattern A and this movement continues until the light sensitive cell apertures 63 intercept a greater area of the shaded portions of the images. As a result, the intensity of light passing through the apertures 63 is decreased and the quantity of current flowing through the load coil of the electromagnet 19 is correspondingly decreased to such an extent that the spring 41 operates the valve 18 to permit movement of the ram 14 by the spring 27 in a direction to withdraw the tool C from the work and move the optical unit D toward the pattern A. In other words, the light sensitive cell apertures 63 are maintained in intersecting relationship with their respective contour lines throughout the scanning operation and, since the contour lines represent a section of the pattern as viewed from the light sensitive cells, it follows that the tool C will exactly reproduce these contour lines in the work blank.

In the event that the reflection of radiant energy to one of the photoelectric cells is blocked, the remaining cell will effect the required control of the electromagnet 19 in accordance with the same principles previously discussed in connection with both cells. Thus, the light sensitive cells separately or collectively control the operation of the tool through the control circuit including the amplifier and electromagnet.

It will, of course, be understood that when both cells are in operation, the value of the current in the output circuit of the amplifier including the load coil 39 of the electromagnet is increased and the depth of cut of the tool in the work blank will be correspondingly increased. However, the control system is so adjusted that under all normal conditions, the difference in the depth of cut is not sufficient to introduce any appreciable error. In actual practice, the greatest difference in the depth of cut between both cells operating and a single cell operating is approximately .004 and this tolerance is clearly within practical limits. Furthermore, it is possible to predetermine the resulting error in duplicating any one model and this error may be compensated for by taking the same into consideration when initially setting the tool. Attention may also be called to the fact that a further error exists when the two light sensitive cells are alternately operated due to the fact that the contour lines 64 and 65 are spaced from each other. However, in actual practice, the minimum space is provided between the contour lines 64 and 65 with the result that the discrepancy or error resulting from the spacing between the contour lines is negligible.

What I claim as my invention is:

1. In a reproducing machine, a pattern having a surface to be reproduced in the work blank, an optical system for scanning the pattern surface and having means for casting an image on the pattern surface, the opposite edges of the image being in the form of contour lines representing sections of the pattern surface, said optical system also having a pair of light sensitive cells predeterminedly positioned with respect to the image casting means to receive radiant energy reflected from the model surface and each light sensitive cell having a light permeable aperture, the apertures of the light sensitive cells respectively intersecting the contour lines of the image whereby the light sensitive cells are responsive to the flux of radiant energy reflected from the model surface at opposite sides of the contour lines, means controlled by the light sensitive cells to relatively move the pattern and optical unit toward and away from each other in dependence upon the flux of radiant energy intercepted by the cells, and a work blank and tool relatively movable toward and away from each other by said means.

2. In a reproducing machine, a pattern having a surface to be reproduced in the work blank, an optical system for scanning the pattern surface and having means for casting an image on the pattern surface, the opposite edges of the image being in the form of contour lines representing sections of the pattern surface, said optical system also having a pair of light sensitive cells predeterminedly positioned at opposite sides of the image projecting means to receive radiant energy reflected from the pattern surface, a plate shielding each light sensitive cell and each plate having an aperture therein, means associated with each cell for projecting a reflection of the image on each plate with one contour line of the image reflected on one plate intersecting the aperture in said plate and with one contour line of the image reflected on the other plate intersecting the aperture in the latter plate whereby the conductivity of the cells depends on the extent the apertures intercept the illuminated portions of the reflected images, means controlled by the light sensitive cells for relatively moving the pattern and optical system toward and away from each other to maintain the apertures in intersecting relation to their respective contour lines, and a work blank and tool relatively movable toward and away from each other by said last named means.

3. In a reproducing machine, a pattern having a surface to be reproduced in the work blank, an optical system for scanning the pattern surface and having means for casting an image on the pattern surface, the opposite edges of the image being in the form of contour lines representing sections of the pattern surface, said optical system also having a pair of light sensitive cells predeterminedly positioned at opposite sides of the image projecting means to receive radiant energy reflected from the pattern surface, a plate shielding each light sensitive cell and each plate having an aperture therein, means associated with each cell for projecting a reflection of the image on each plate with one contour line of the image reflected on one plate intersecting the aperture in said plate and with the other contour line of the image reflected on the other plate intersecting the aperture in the latter plate whereby the conductivity of the cells depends on the extent the apertures intercept the illuminated portions of the reflected images, means controlled by either or both the light sensitive cells for relatively moving the pattern and optical system toward and away from each other to maintain one or both apertures in intersecting relation to one or both contour lines, and a work blank and tool correspondingly relatively movable by the last named means to reproduce the contour lines in the work blank.

4. In a reproducing machine, a pattern having a surface to be reproduced in the work blank, an optical system for scanning the pattern surface and having means for casting an image on the pattern surface, the opposite edges of the image being in the form of contour lines representing sections of the pattern surface, said optical system also having a pair of light sensitive cells predeterminedly positioned with respect to the image casting means to receive radiant energy reflected from the model surface and each light sensitive cell having a light permeable aperture, the apertures of the light sensitive cells respectively intersecting the contour lines of the image whereby the light sensitive cells are responsive to the flux of radiant energy reflected from the model surface at opposite sides of the contour lines, means controlled by either or both light sensitive cells for relatively moving the pattern and optical system in directions toward and away from each other to maintain one or both apertures in intersecting relationship with one or both contour lines, and a work blank and tool relatively movable in directions toward and away from each other by said means.

5. In a reproducing machine, a pattern having a surface to be reproduced in the work blank, an optical system for scanning the pattern surface and having means for casting an image on the pattern surface, the opposite edges of the image being in the form of contour lines representing sections of the pattern surface, said optical system also having light sensitive cells respectively positioned on the right and left hand side of the image projecting means to receive radiant energy reflected from the pattern surface, a plate shielding each cell and each plate having an aperture therethrough, means associated with each cell for projecting a reflection of the image on each plate with the contour line at the right-hand edge of the image cast on the pattern surface intersecting the aperture in the plate shielding the left-hand cell and with the contour line defining the left-hand edge of the image on the pattern surface intersecting the aperture shielding the right-hand cell, whereby energization of the cells depends on the extent the apertures intercept the illuminated areas of the refletced images, means controlled by the light sensitive cells for relatively moving the pattern and optical system in directions toward and away from each other to maintain the apertures in intersecting relation to their respective contour lines of the reflected images, and a work blank and tool relatively movable toward and away from each other by the last named means.

6. In a reproducing machine, a work blank, a tool supported opposite the work blank, means supporting the work blank and tool for relative movement toward and away from each other, a pattern having a surface to be duplicated in the work blank by the tool, an optical system for scanning the pattern surface and having means for casting an image on the pattern surface, the opposite edges of the image being in the form of contour lines representing sections of the pattern surface, an apertured plate shielding each light sensitive cell, means associated with each cell for projecting a reflection of the image on each plate in such a manner that one contour line of the image reflected on one of the plates intersects the aperture in the latter plate and the other contour line of the image reflected on the other plate intersects the aperture in the said other plate whereby the conductivity of the cells depends upon the extent the apertures intersect the illuminated portions of the reflected images, and means controlled by either or both of the light sensitive cells for relatively moving the work blank and tool toward and away from each other.

EVERETT J. COOK.